US009446537B1

(12) United States Patent
Murray et al.

(10) Patent No.: US 9,446,537 B1
(45) Date of Patent: Sep. 20, 2016

(54) METHODS AND APPARATUSES FOR CUTTING OF THIN FILM SOLAR CELLS

(75) Inventors: Michael A. Murray, Brentwood, CA (US); Kedar Y. Hardikar, Santa Clara, CA (US)

(73) Assignee: BEIJING APOLLO DING RONG SOLAR TECHNOLOGY CO., LTD., Beijing (CN)

( * ) Notice: Subject to any disclaimer, the term of this patent is extended or adjusted under 35 U.S.C. 154(b) by 796 days.

(21) Appl. No.: 13/566,569

(22) Filed: Aug. 3, 2012

Related U.S. Application Data

(60) Provisional application No. 61/557,768, filed on Nov. 9, 2011.

(51) Int. Cl.
| | | |
|---|---|---|
| B28B 11/14 | (2006.01) |
| B29C 51/32 | (2006.01) |
| B30B 11/22 | (2006.01) |
| B29C 47/00 | (2006.01) |
| B28B 3/12 | (2006.01) |

(52) U.S. Cl.
CPC ............... B28B 11/14 (2013.01); B28B 3/123 (2013.01); B28B 3/126 (2013.01); B28B 11/145 (2013.01); B29C 47/0066 (2013.01); B29C 51/32 (2013.01); B29C 51/325 (2013.01); B29C 2793/0027 (2013.01); B30B 11/227 (2013.01)

(58) Field of Classification Search
CPC . B29C 51/32; B29C 51/325; B29C 47/0066; B29C 2793/0027; B28B 3/123; B28B 3/126; B28B 11/14; B30B 11/227
USPC .................................................. 425/294, 292
See application file for complete search history.

(56) References Cited

U.S. PATENT DOCUMENTS

| | | | | |
|---|---|---|---|---|
| 3,994,215 A | * | 11/1976 | Rabeler | 99/483 |
| 4,340,342 A | * | 7/1982 | Kim | 425/72.1 |
| 4,921,643 A | * | 5/1990 | Walton et al. | 264/282 |
| 5,202,271 A | | 4/1993 | Kouzuma et al. | |
| 5,457,057 A | | 10/1995 | Nath et al. | |
| 8,168,102 B2 | * | 5/2012 | Di Berardino | 264/156 |
| 2004/0069340 A1 | | 4/2004 | Luch | |

OTHER PUBLICATIONS

Austin, Alex et al., U.S. Appl. No. 12/421,499, titled "Methods and Appartuses for Unsupported Cutting of Thin Film Solar Cells," filed Apr. 9, 2009.

Murray, Michael A. et al., U.S. Appl. No. 61/557,768, titled "Methods and Apparatuses for Cutting of Thin Film Solar Cells," filed Nov. 9, 2011.

(Continued)

*Primary Examiner* — Seyed Masoud Malekzadeh
(74) *Attorney, Agent, or Firm* — Weaver Austin Villeneuve & Sampson LLP

(57) ABSTRACT

Methods and apparatuses for cutting thin film solar cells are provided. According to various implementations, the methods involve cutting a substrate having thin film solar cell materials deposited thereon by inducing a tear along the cutting line. Simultaneously with the tearing, the torn edges may be plastically deformed to produce a desired torn edge cross-sectional profile. Such a fracture may be induced by clamping regions of the substrate while simultaneously displacing the clamped regions relative to each other through the thickness of the substrate as the substrate is fed through the clamps providing the clamping. Apparatuses for cutting are also provided. According to various implementations, the apparatus may have cutter rollers and support rollers configured with an adjustable radial overlap.

14 Claims, 12 Drawing Sheets

(56) References Cited

OTHER PUBLICATIONS

U.S. Patent Application title "Methods and Apparatuses for Unsupported Cutting of Thin Film Solar Cells," filed Jun. 4, 2009, by Austin et al., U.S. Appl. No. 12/478,553.

Office Action dated Jan. 4, 2012, issued in U.S. Appl. No. 12/478,553.

Final Office Action dated Aug. 28, 2012, issued in U.S. Appl. No. 12/478,553.

* cited by examiner

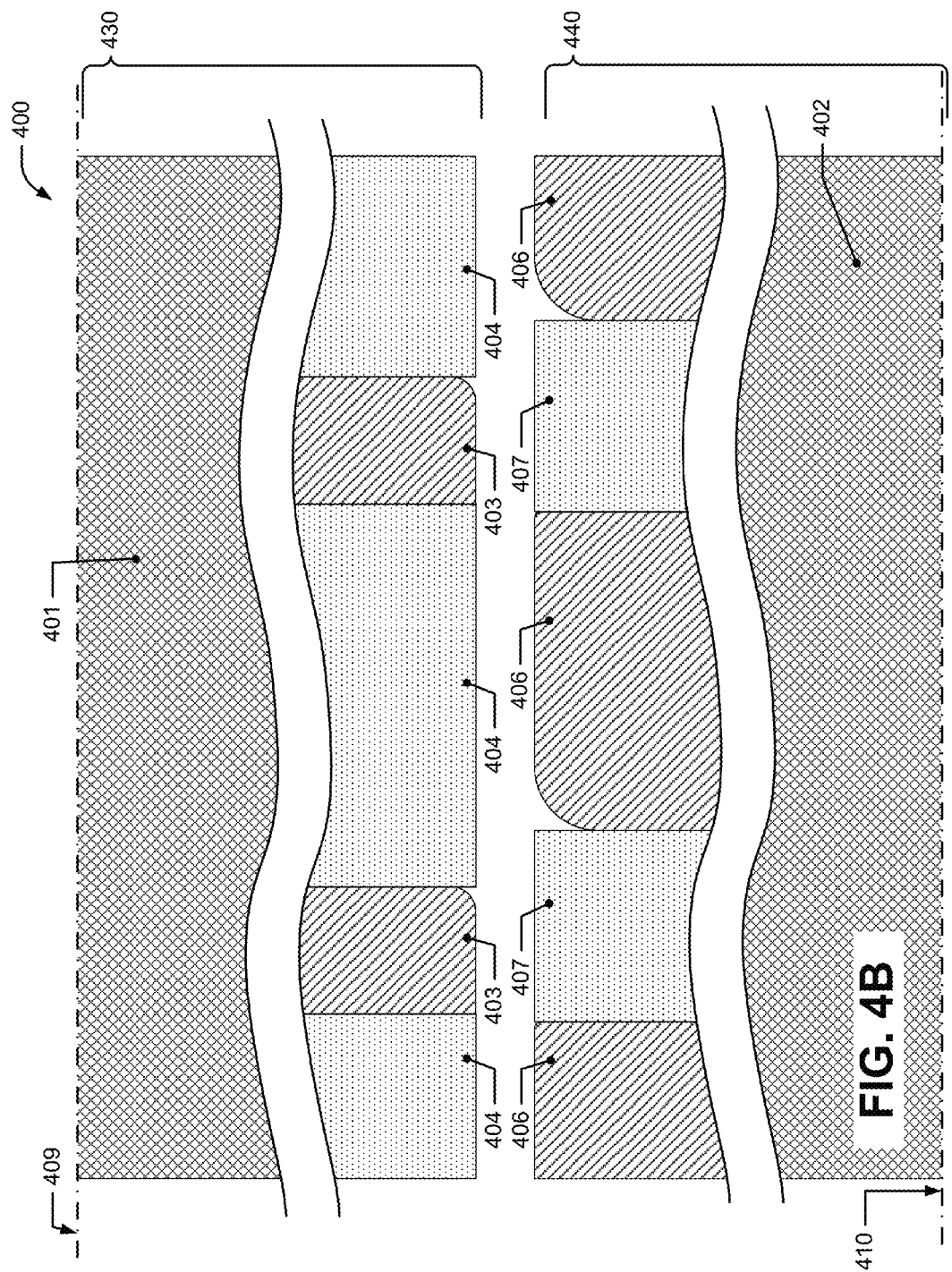

METHODS AND APPARATUSES FOR CUTTING OF THIN FILM SOLAR CELLS

CROSS-REFERENCE TO RELATED APPLICATIONS

This application claims benefit under 35 U.S.C. §119(e) to U.S. Provisional Application No. 61/557,768, filed Nov. 9, 2011, titled "METHODS AND APPARATUSES FOR CUTTING OF THIN FILM SOLAR CELLS," which is incorporated by reference herein in its entirety.

BACKGROUND OF THE INVENTION

Photovoltaic (PV) cells are widely used in for generation of electricity. Multiple PV cells may be interconnected in a module assembly. Such modules may be integrated into building structures or otherwise assembled to convert solar energy into electricity by the PV effect.

Certain PV cell fabrication processes involve depositing thin film materials on a substrate to form a light absorbing layer sandwiched between electrical contact layers. The front or top contact is a transparent and conductive layer for current collection and light enhancement, the light absorbing layer is a semiconductor material, and the back contact is a conductive layer to provide electrical current throughout the cell.

In one example of a fabrication process, a metallic back electrical contact layer is deposited on a substrate. A p-type semiconductor layer is then deposited on the back contact electrical contact layer and an n-type semiconductor layer is deposited on the p-type semiconductor layer to complete a p-n junction. Any suitable semiconductor materials, such as CIGS, CIS, CdTe, CdS, ZnS, ZnO, amorphous silicon, polycrystalline silicon, etc. may be used for these layers. A top transparent electrode layer is then deposited on the p-n junction. This layer may be a conductive oxide or other conductive film and is used for current collection. Once these or other materials have been deposited on the substrate to form a PV stack, the substrate and thin film materials deposited on it are cut into cell-sized units.

SUMMARY OF THE INVENTION

Methods and apparatuses for cutting thin film solar cells are provided. A PV substrate may be clamped or held in multiple locations across the PV substrate. Alternating clamped portions of the PV substrate may then be offset from one another through an axis substantially normal to the PV substrate to induce local strains between the clamped portions. The strains may include areas of large, plastic strain in which fractures and permanent deformation occur, e.g., tearing as well as torn edge shaping, and areas of lesser, elastic strain. For example, some portions of the PV substrate may experience plastic strain sufficient to cause fracture or tearing, whereas other portions of the PV substrate may experience lesser plastic strain sufficient to cause permanent plastic deformation, but not fracture or tearing. The clamped portions may be clamped between cutter rollers and compliant rollers. In this document, cutter rollers may be referred to both as cutter rollers and support rollers—the "support roller" label is used to identify cutter rollers located "underneath" the substrate from cutter rollers located "above" the substrate. The support rollers may contribute to the cutting/tearing process in much the same manner as the cutter rollers do. The PV substrate may then be fed between the rollers, e.g., rolled. As the substrate is rolled between the clamping features, the local strain area may travel along the PV substrate in a direction parallel to the direction the PV substrate is fed. The fractures in the PV substrate may thus produce a linear cut or tear along the strained area. Various implementations are described below.

One implementation provides for an apparatus for cutting a web with a first face, a second face opposite the first face and offset from the first face by a nominal thickness t. The apparatus may include a plurality of cutter rollers, each cutter roller including a substantially cylindrical cutter-web contact surface, a first side, and a second side, wherein the cutter-web contact surface intersects the first side to form a first edge. The apparatus may further include a cutter arbor, wherein each cutter roller is coupled with the cutter arbor such that the cutter-web contact surfaces are coaxial with each other. The apparatus may additionally include a plurality of support rollers, each support roller including a substantially cylindrical support-web contact surface, a third side, and a fourth side, wherein the support-web contact surface intersects the third side to form a third edge, wherein the third edge is rounded with a third radius. The apparatus may also include a support arbor, wherein each support roller is coupled with the support arbor such that the support-web contact surfaces are coaxial with each other, wherein the center axes of the cutter-web contact surfaces and the support-web contact surfaces are parallel and offset such that the web may be fed between the cutter arbor and the support arbor with the first face contacting the cutter-web contact surfaces and the second face contacting the support-web contact surfaces, and wherein the support rollers and the cutter rollers are axially spaced such that the support rollers and the cutter rollers interleave in a non-interfering manner when the support arbor and the cutter arbor are configured such that the offset is less than half the sum of the largest diameter of the support rollers and the largest diameter of the cutter rollers. In such an apparatus, the first sides are offset from the third sides by first gaps, wherein the minimum separation between the first edge and the third edge associated with each first gap is greater than t. A further implementation provides for an apparatus which is configured to allow the offset to be varied.

Another further implementation of the apparatus provides a plurality of compliant first rollers, each compliant first roller including a substantially cylindrical first-roller-web contact surface, wherein each compliant first roller is coupled with the cutter arbor such that the first-roller-web contact surface is coaxial with the cutter-web contact surfaces and located between neighboring cutter rollers; and a plurality of compliant second rollers, each compliant second roller including a substantially cylindrical second-roller-web contact surface, wherein each compliant second roller is coupled with the support arbor such that the second-roller-web contact surface is coaxial with the support-web contact surfaces and located between neighboring support rollers.

In some implementations, the first edge is not rounded. In other implementations, the first edge is rounded with a first radius substantially smaller than the third radius.

In some implementations, the first-roller-web contact surface includes a relief area of a smaller diameter than the largest diameter of the first-roller-web contact surface and/or the second-roller-web contact surface includes a relief area of a smaller diameter than the largest diameter of the second-roller-web contact surface.

In some implementations, the cutter-web contact surface intersects the second side to form a second edge, wherein the second edge is rounded with a second radius, wherein the support-web contact surface intersects the fourth side to form a fourth edge, wherein the fourth edge is rounded with a fourth radius, wherein the second radius and the fourth radius are larger than the third radius, and wherein the second side and the fourth side of a cutter roller and a neighboring support roller, respectively, are offset by a second gap, wherein the second gaps are larger than the first gaps.

In one implementation, the apparatus is configured to tear the web in regions of the web which are bracketed between the first edge and the third edge of neighboring cutter and support rollers when the web is fed through the apparatus. In one implementation, the tear is formed closer to the first edge than the third edge.

In some implementations, the apparatus is configured to maximize in-plane loading on the web in regions of the web which are bracketed between the first edge and the third edge of neighboring cutter and support rollers when the web is fed through the apparatus. The apparatus may also be configured to minimize shear loading through the thickness of the web in regions of the web which are bracketed between the first edge and the third edge of neighboring cutter and support rollers when the web is fed through the apparatus.

In one implementation, the apparatus is configured to form a first clamping region between each cutter-web contact surface and the corresponding second-roller-web contact surface and form a second clamping region between each support-web contact surface and the corresponding first-roller-web contact surface, such that portions of the web clamped in the first clamping region and the second clamping region are held substantially parallel by the cutter-web contact surfaces, the support-web contact surfaces, the first-roller-web contact surfaces, and the second-roller-web-contact surfaces when the web is fed through the apparatus.

In some implementations, the apparatus is configured such that the first regions are offset from the second regions, the portions of the web which are not in the first region or the second region but are between the second edges and the fourth edges are flexed through a first acute angle, and the portions of the web which are not in the first region or the second region but are between the first edges of the cutter rollers and the third edges of the support rollers are flexed through a second acute angle substantially larger than the first acute angle.

In one implementation, the distance between each first edge is approximately 35 mm.

In one implementation, an apparatus for cutting a web with a first face, a second face opposite the first face and offset from the first face by a nominal thickness t is provided. The apparatus may include a plurality of cutter rollers coaxially-mounted rollers; and a plurality of coaxially-mounted support rollers, wherein the axes of the cutter rollers and the axes of the support rollers are parallel, wherein the apparatus is configured to allow the web to be fed between the cutter rollers and the support rollers such that the first face is in contact with the cutter rollers and the second face is in contact with the support rollers, and wherein the apparatus is configured to separate the web into a plurality of strips wherein one edge of each strip is rolled into a bent edge over a support roller and wherein an opposing edge of each strip is formed into a bent edge in the opposite direction as the rolled bent edge.

In another implementation, a method for cutting a web with a first face, a second face opposite the first face and offset from the first face by a nominal thickness t is provided. The method may include contacting the first face with a substantially cylindrical cutter roller, the cutter roller including a first edge and a second edge; contacting the second face with a substantially cylindrical support roller, the support roller including a rounded third edge and a fourth edge, the support roller axially parallel to the cutter roller, the third edge offset along the support roller axis from the first edge, the third edge closer to the first edge than the second edge is to the fourth edge, and the support roller axis and the cutter roller axis offset from each other such that the support roller and the cutter roller interleave in a non-interfering manner; rotating the cutter roller, rotating the support roller in a direction opposite the rotation of the cutter roller, and feeding the web between the cutter roller and the support roller.

In a further implementation, the method may include contacting the first face with a substantially cylindrical compliant first roller, the compliant first roller coaxial with the cutter roller; contacting the second face with a substantially cylindrical compliant second roller, the compliant second roller coaxial with the support roller, rotating the compliant first roller with the cutter roller, and rotating the compliant second roller with the support roller.

In yet a further implementation, the method may include inducing tension in a portion of the web between the first edge and the third edge, wherein the tension is induced in a direction parallel to the local orientation of the first face in the portion of the web, and wherein the local orientation of the first face is not parallel to the local orientation of the first face across most of the portion of the first face in contact with the cutter roller and compliant first roller. The method may include fracturing the web in the portion of the web by increasing the tension.

In some implementations, the method may include roll-forming the second face over the third edge and/or roll-forming the first face over the first edge.

In some implementations, a photovoltaic (PV) cell is provided. The PV cell may include a substrate having thin-film PV layers disposed thereon, wherein the substrate includes: a first edge and a parallel second edge, a first portion contiguous with the first edge, a second portion contiguous with the second edge, and a third portion between the first portion and the second portion, wherein the first portion is bent at a first angle with respect to the third portion, and wherein the second portion is bent at a second angle with respect to the third portion and in the opposite direction from the direction the first portion is bent. In some implementations, the substrate may be steel. In some implementations, the PV layers include a CIGS layer.

In one implementation, the bend radius associated with the first portion is smaller than the bend radius associated with the second portion. The first edge may be a torn edge and/or not a shorn edge. The PV cell may be formed from a larger web of PV material.

These and other aspects of the invention are described further below with reference to the figures.

BRIEF DESCRIPTION OF THE DRAWINGS

FIG. 4B depicts a detail section view of the cutter roller and the support roller of FIG. 4A.

DETAILED DESCRIPTION

Figure 1:
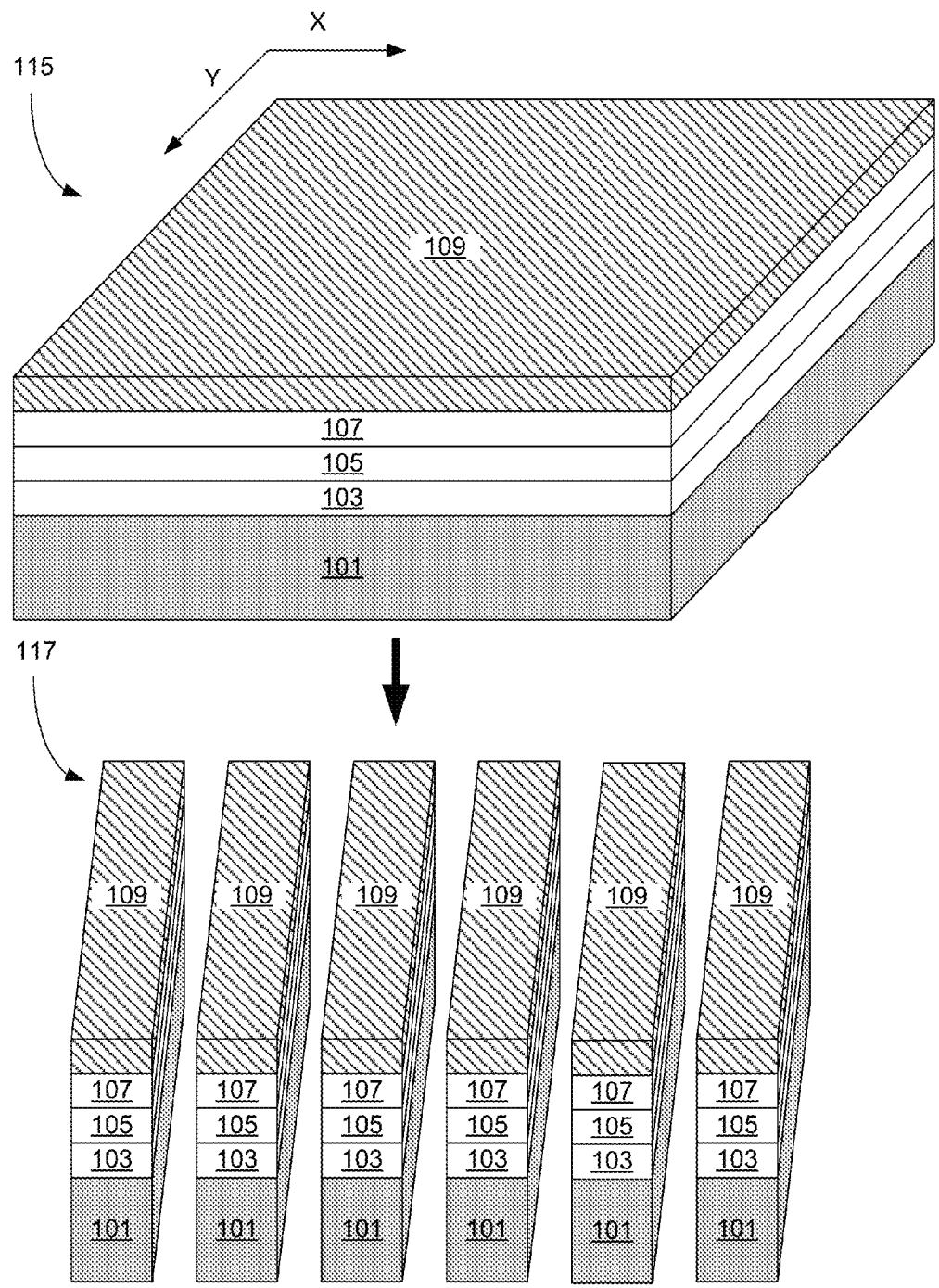
FIG. 1 depicts a conceptual PV layered stack as both an uncut layered stack and as a series of cut PV cell strips.

Reference will now be made in detail to specific implementations of the invention. Examples of the specific implementations are illustrated in the accompanying drawings. While the invention will be described in conjunction with these specific implementations, it will be understood that it is not intended to limit the invention to such specific implementations. On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well known mechanical apparatuses and/or process operations have not been described in detail in order not to unnecessarily obscure the present invention.

Various terms as used herein are first defined as follows.

Neighboring: In the context of rollers sharing a common axis, the neighboring rollers of a given roller are one or both rollers closest to the given roller and coaxial with the given roller. In the context of rollers located on two non-coaxial axes, the neighboring rollers for a given roller are the rollers which would be closest to the given roller if the axes were instead coaxial.

Edge: An edge, in the context of rollers, may refer to a sharp or rounded edge. In the case of a sharp edge, the edge refers to the region where two surfaces, e.g., a cylindrical surface and a side, intersect. In the case of a rounded edge, the intersecting surfaces may, in reality, not actually intersect since the round acts to terminate the surfaces before they contact each other. However, such rounded geometries are still referred to herein as "edges" despite the lack of an actual surface intersection. Edges, in the context of a PV cell, may refer to the sides of the cell which define the overall, two-dimensional shape of the PV cell. For example, a rectangular PV cell would generally be defined by four edges.

Sides: In the context of rollers, sides refer to reference surfaces which bound either end of a substantially cylindrical contact surface, i.e., a side is a substantially planar reference surface which is orthogonal to the central axis of the substantially cylindrical contact surface and which intersects or would intersect with a roller contact surface or an extension of the roller contact surface. The sides of a roller may include features which do not correspond with the side, such as grooves, ridges, holes, pins, etc. The ends of a roller may also not be truly planar, e.g., the ends of a roller may feature a slight taper or curved profile. These features should not be viewed as incompatible with the "sides" as described above.

Substantially cylindrical: In the context of the contact surfaces of the rollers, "substantially cylindrical" means that the contact surfaces are nominally cylindrical in shape. Such surfaces may, for example, be ridged, grooved, textured, etc. while still being "substantially cylindrical." Substantially cylindrical surfaces may also include slight tapers or other relief features, such as step-downs in diameter.

Edge round/radius: An edge where two surfaces meet, or where two surfaces would intersect if extended until intersection occurs, may be sharp or may be smoothed in some manner. One common smoothing technique is to round the edge with a constant radius. Other smooth profiles may be used, such as non-circular curves, although typically such smoothing still involves a smoothing profile which is tangent to one or both of the surfaces forming the edge. In this application, reference to an edge as "rounded" or with a "radius" should be interpreted as encompassing non-circular or variable-radius blends between two surfaces and partial-round features as well as standard constant-radius rounds.

Local orientation: The orientation of a portion of a larger part with respect to the general orientation of the larger part. For example, a strip of material which is bent at a 30° angle at one end with respect to the general orientation of the entire strip of material would have a local orientation in the bent portion which was at a 30° angle.

Web: The term "web," as used herein, refers to a large, thin sheet. The web may, for example, be a relatively discrete sheet of material, such as a 1 m by 2 m sheet, or may be relatively continuous, such as a sheet fed from a roll of material. The web may also be a laminate material. PV stacks, as described herein, may be implemented as a web or on a web of material.

As indicated above, certain PV cell fabrication processes involve depositing thin film materials on a substrate. These materials may form, for example, a back contact, an absorber material and a top contact layer as well as other possible layers of a PV stack. Once these materials have been deposited on the substrate to form a PV stack, the substrate and thin film materials deposited on it are cut into cell-sized units.

The present invention relates to cutting substrates having thin film solar cell materials deposited thereon. FIG. 1 shows a perspective view 115 of an uncut substrate 101 supporting thin films 103, 105, 107 and 109. For the purposes of illustration, the figure is not to scale; for example, thickness of the substrate may be on the order of mils, the thickness of the thin film stack on the order of microns (or hundredths of mils) with the x- and y-dimensions of the substrate on the order of feet. In certain implementations, substrate 101 is a metallic substrate, e.g., a thin stainless steel foil. In various alternative implementations, substrate 101 may be made of other metals, including but not limited to, titanium, copper, aluminum, beryllium and the like. As indicated, in various implementations of the invention, the substrate 101 is relatively thin, such as for example, less than or equal to about 2-10 mils. However, other suitable thicknesses may also be used. Typically, the substrate is thin enough to be flexible. Back electrical contact layer 103 provides electrical contact to allow electrical current to flow through the PV cell, and may be made of any appropriate material, e.g., molybdenum, niobium, copper, silver, etc. A p-type semiconductor layer 105 is deposited on back electrical contact layer 103 and an n-type semiconductor layer 107 is deposited on p-type semiconductor layer 105 to complete a p-n junction.

According to various implementations, any suitable semiconductor materials, such as CIGS, CIS, CdTe, CdS, ZnS, ZnO, amorphous silicon, polycrystalline silicon, etc. are used for layers 105 and 107. For example, the p-type semiconductor layer 105 may be CIGS or CIS, and the n-type semiconductor layer 107 may be CdS or a cadmium free material, such as ZnS, ZnO, etc. Top transparent electrode layer 109 is deposited on the p-n junction. In certain implementations, top transparent electrode layer 109 is a transparent conducting oxide (TCO), for example, zinc oxide, aluminum-doped zinc oxide (AZO), indium tin oxide (ITO) and gallium doped zinc oxide After deposition of the thin films on the substrate 101, the substrate having thin films deposited thereon may be cut to wholly or partially define cells or modules. In certain implementations, a substrate is cut length wise into multiple cell-width strips. This is illustrated in FIG. 1, which shows substrate 101 cut lengthwise to define multiple cell-width strips 117. For example, a substrate having a width (x-dimension) of 1 m is cut into strips of approximately 35 mm. Long cell-width strips may then be further cut to define individual cells. This is just an example of cutting scheme that may be used; according to various implementations, a substrate having thin films deposited thereon may be cut in a variety of manners to wholly or partially define cells. A typical PV module may include several such PV cell strips which are connected in series. To implement such an arrangement, small wires may be used to electrically connect the topmost conductive layer, e.g., the positive terminal, of a PV cell strip with the bottommost layer, e.g., the negative terminal, of a neighboring PV cell strip.

Due to the layered nature of PV cells, existing shear-cutting technologies may be unsuited for cutting the PV cell strips. This is because the shearing action may cause material from one layer to smear across the cut face and contact another layer, which can produce electrical edge shunts. Such shunts may compromise PV performance.

Alternatives which address some of the shortcomings of standard shear-cutting devices are described in U.S. patent application Ser. Nos. 12/421,499 and 12/478,553, which are hereby incorporated by reference in their entireties.

Figure 2A:
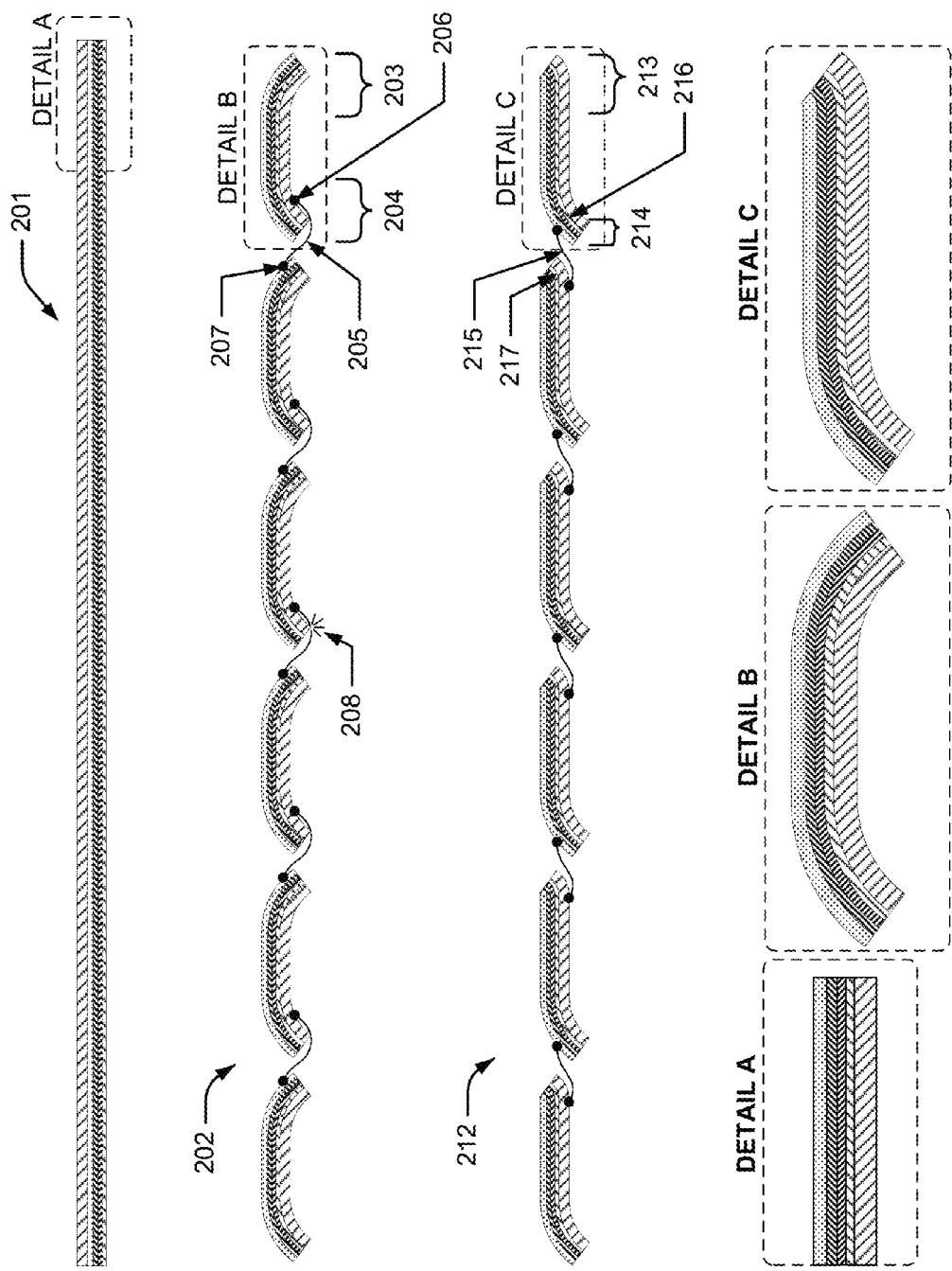
FIG. 2A depicts a side view of a conceptual PV layered stack, a series of interconnected PV cell strips featuring dual down-burr edges, a series of interconnected PV cell strips featuring down-burr/up-burr edges.

FIG. 2A shows a conceptual diagram of PV stack 201 which may be used, in this example, to produce six PV cell strips 202 or six PV cell strips 212. PV cell strips 202 include dual down-burrs, and PV cells strips 212 include matched up-burr/down-burrs as described herein.

Each PV cell strip 202 includes down-burrs 203 and 204. Each PV cell strip 202 may be linked to a neighboring PV cell strip 202 by a conductor, such as wire 205. Wire 205 may be electrically connected 206 with the bottom side of one PV cell strip 202 and electrically connected 207 with the top side of a neighboring PV cell strip 202. The present inventors have realized that the down-burrs may interact with the small wires used to implement this circuit in undesirable ways, e.g., by cutting or increasing wear and tear on the wires. For example, wire 205 linking the two middle PV cell strips 202 has been broken at 208 due to stresses introduced by contact with down-burr 204.

Figure 2B:
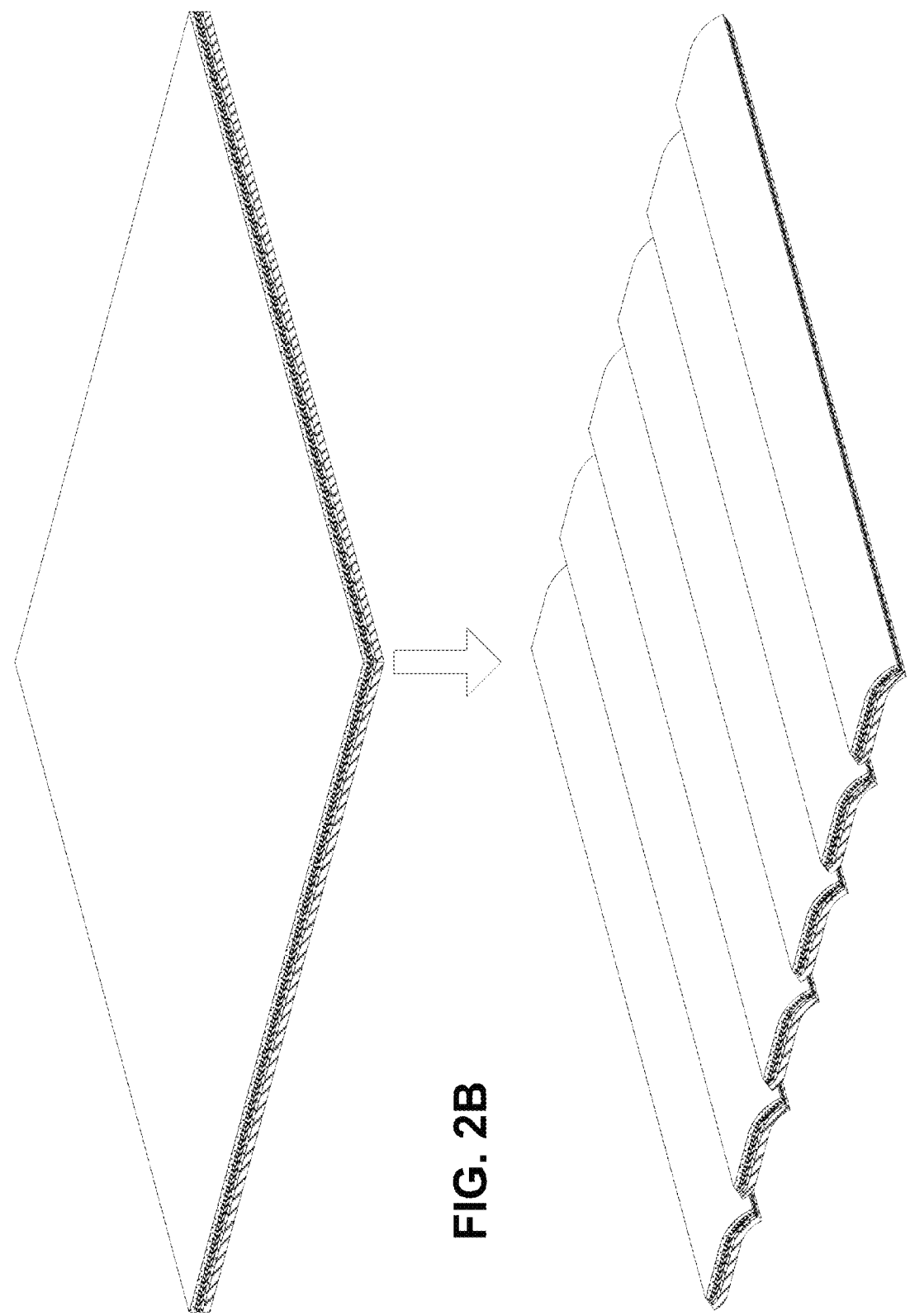
FIG. 2B depicts an isometric view of the conceptual PV layered stacks of FIG. 2A.

The present inventors have further realized that PV cell strips which are cut in such a manner that one cut edge has a down-burr and the other, parallel, cut edge has an up-burr may significantly reduce the possibility of severing or otherwise damaging a wire. Each PV cell strip 212 includes down-burr 213 and up-burr 214. Each PV cell strip 212 is linked to a neighboring PV cell strip 212 by a conductor, such as wire 215. Wire 215 may be electrically connected 216 with the bottom side of one PV cell strip 212 and electrically connected 217 with the top side of a neighboring PV cell strip 212. Because each neighboring pair of PV cell strips 212 is matched down-burr edge to up-burr edge, wire 215 is provided a pathway free of the stress riser which may be present with the two-down-burr PV cell strips. FIG. 2B shows an isometric view of PV stack 201 and PV cell strips 212.

Figure 3:
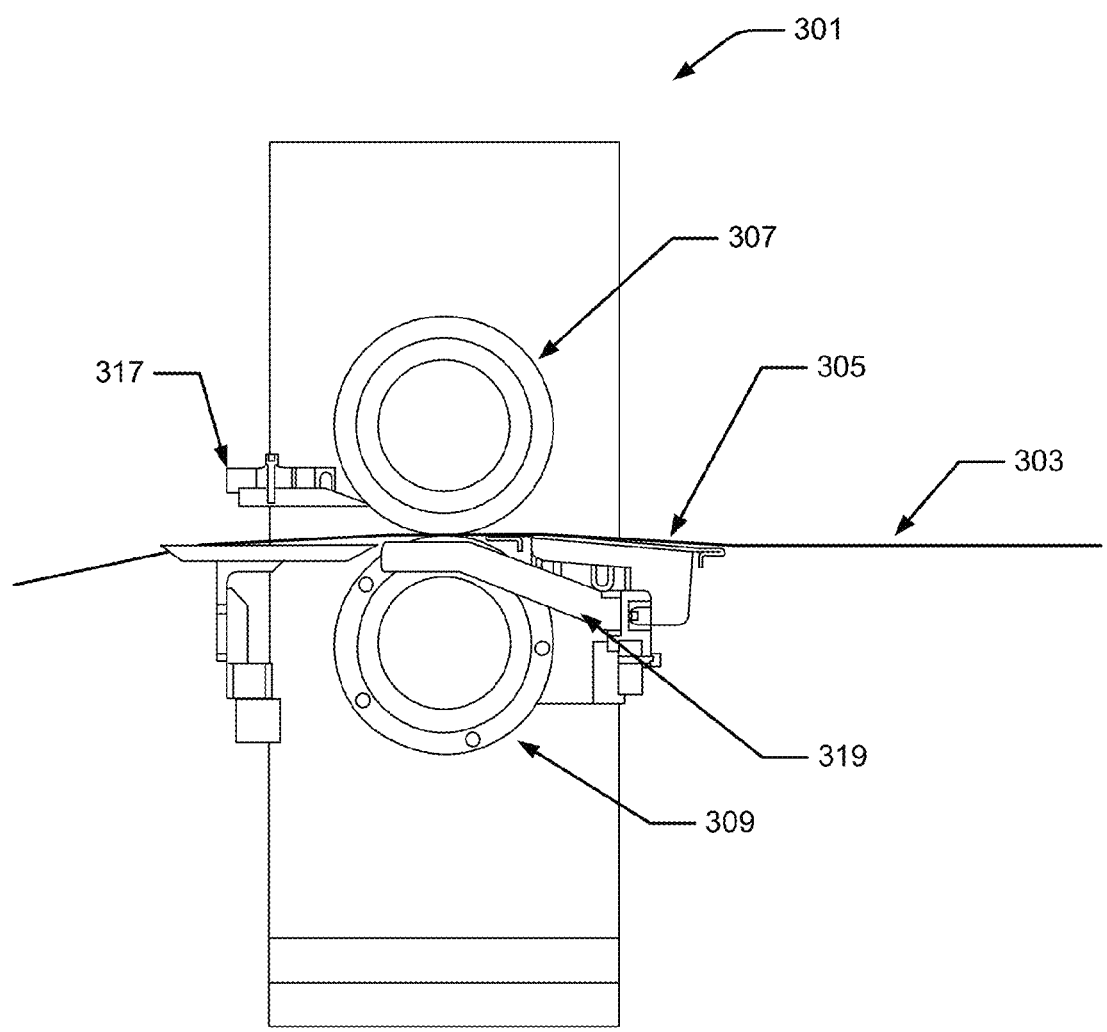
FIG. 3 depicts a side view of a cutter apparatus according to certain implementations.

Various methods and apparatuses described herein may be used to produce such up-burr/down-burr PV cell strips. FIG. 3 is a side view of a cutting apparatus 301 according to certain implementations that may be used to cut a substrate/thin film stack into multiple cell-width sized strips as depicted schematically in FIG. 1. An uncut substrate 303 having a film stack thereon is fed to the cutter by in-feed 305. The in-feed 305 and cutting apparatus may be configured for various substrate sizes. Substrate 303 may of any width, e.g., between about 0.3 m and 3 m, e.g., 1 m, though other sizes may be used as appropriate. In certain implementations, substrate 303 is fed into the cutter after emerging from a thin film deposition chamber or chambers. According to various implementations, the substrate 303 may be on a roll or web, or may be in fed into the cutter 301 as a discrete sheet. For example, in one processing scheme, thin film materials are deposited on a vertical web of stainless steel foil, with transverse cuts then made to form sheets of the steel substrate/film prior to being fed into the cutter. The unwound roll or sheet may be supported by a support (not shown) while being fed into cutter 301. Cutter 301 includes two rotating cylinders, between which substrate 303 is fed: cutting cylinder 307 and support cylinder 309. In certain implementations, substrate 303 is continuously fed into the cutter, with rotating blades on cutting cylinder 307 cutting the substrate into strips as the substrate is moved through the cutter by the rotating support cylinder 309. The cut strips exit the cutter via out-feed 311.

In certain implementations, a bar parallel to the cutting cylinder is positioned above the substrate plane on the out-feed side to knock down stray strips that fly up after emerging from the cutter. For example, the cutting apparatus depicted in FIG. 3 includes knock-down bar 317. The apparatus in FIG. 3 also includes a finger feature 319 that keeps strips from rewrapping. Additional details of cutting apparatus 301 are described further below.

Figure 4A:
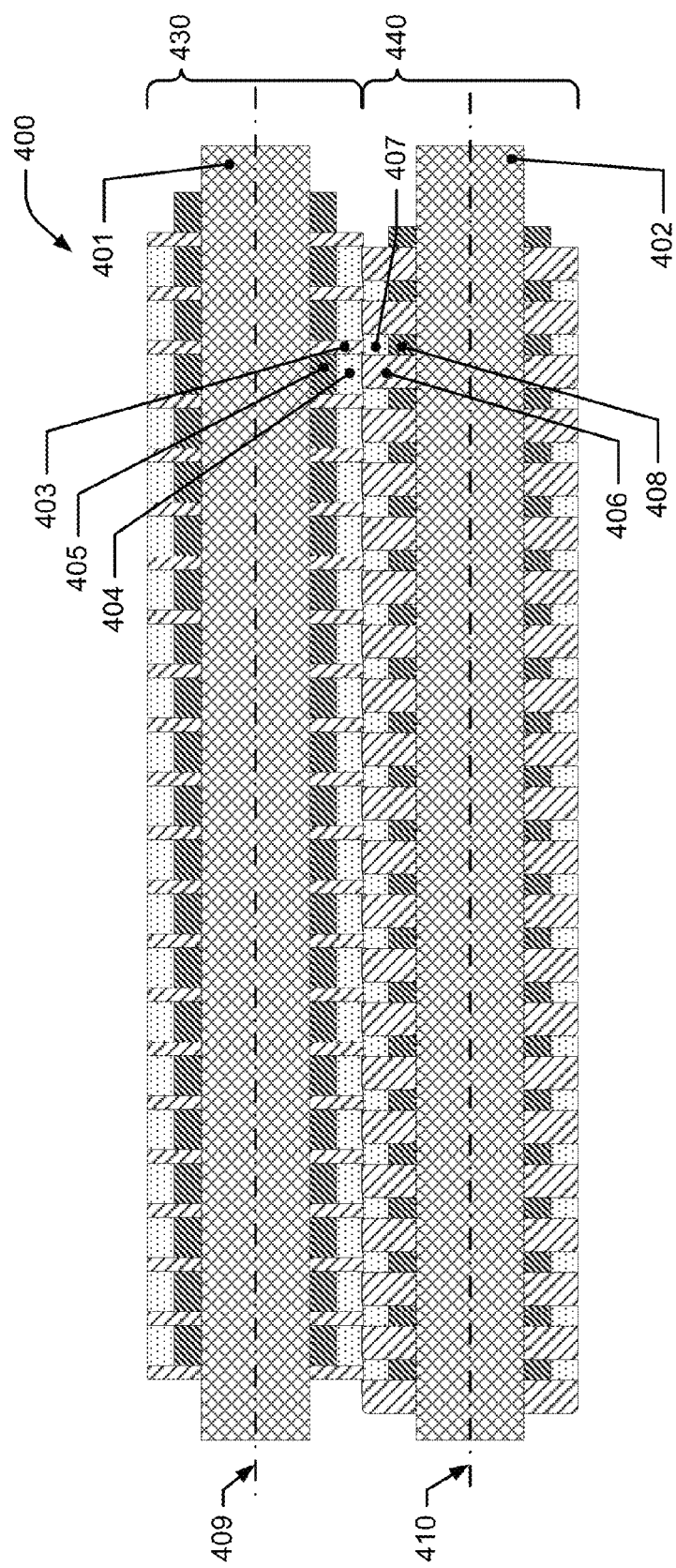
FIG. 4A depicts a front section view of a cutter roller and a support roller.

FIG. 4A is a sectional front view of the cutter mechanism 400, including cutting cylinder 430 and support cylinder 440 of an example implementation. FIG. 4B is an enlarged view of the sectional front view of FIG. 4A, although portions of both cutting cylinder 430 and support cylinder 440 between the outer diameters of those cylinders and the central axes of those cylinders have been omitted for clarity. Cutter arbor 401 and support arbor 402 are mounted within the cutting apparatus such that rotational axis 409 and rotational axis 410, respectively, are parallel and offset. In implementations where cutter arbor 401 and/or support arbor 402 are substantially cylindrical, rotational axes 409 and/or 410, respectively, may be coaxial with the cylinder central axes. At least one of cutter arbor 401 and support arbor 402 may be movable to allow the axial separation distance between cutter arbor 401 and support arbor 402 to be adjusted. Cutter arbor 401 and support arbor 402 may be rotatable about rotational axis 409 and rotational axis 410, respectively. One or both of cutter arbor 401 and support arbor 402 may be rotationally driven by a motor or other drive system.

A plurality of cutter rollers 403 may be mounted to cutter arbor 401 in a concentric manner such that cutter rollers 403 rotate with cutter arbor 401. Each cutter roller 403 includes a substantially cylindrical outer surface. In some implementations, cutter arbor 401 may not be cylindrical, e.g., a square shaft; in such implementations, cutter rollers 403 may be mounted to cutter arbor 401 such that the outer surfaces of cutter rollers 403 are concentric with rotational axis 409. Cutter rollers 403 may be keyed to cutter arbor 401 or otherwise prevented from rotating with respect to cutter arbor 401. Cutter rollers 403 may be spaced at approximately the same spacing as the desired width of the PV cell strips which may be produced using the cutting apparatus; it should be understood that "spacing," in this context, refers to the spacing between a reference point on a given cutter roller 403 and a corresponding reference point on a neighboring cutter roller 403.

A plurality of support rollers 406 may be mounted to support arbor 402 in a concentric manner such that support rollers 406 rotate with support arbor 402. Each support roller 406 includes a substantially cylindrical outer surface. In some implementations, support arbor 402 may not be cylindrical, e.g., a square shaft; in such implementations, support rollers 406 may be mounted to support arbor 402 such that the outer surfaces of support rollers 406 are concentric with rotational axis 410. Support rollers 406 may be keyed to support arbor 402 or otherwise prevented from rotating with respect to support arbor 402. Support rollers 406 may be spaced at approximately the same spacing as the desired width of the PV cell strips which may be produced using the cutting apparatus; it should be understood that "spacing," in this context, refers to the spacing between a reference point on a given support roller 406 and a corresponding reference point on a neighboring support roller 406.

The various implementations discussed herein are configured to produce PV cell strips of approximately the same width, and the spacing between neighboring cutter rollers 403, as well as neighboring support rollers 406, is correspondingly substantially uniform. However, some implementations may be configured to produce PV cell strips of differing widths from a single layered stack. This may be implemented by providing correspondingly different spacings between neighboring cutter rollers 403, as well as neighboring support rollers 406. It is to be understood that uniform spacing and non-uniform spacing of cutter rollers 403 and support rollers 406 is contemplated.

Cutter rollers 403 and support rollers 406 may be substantially non-compliant materials. Cutter rollers 403 and support rollers 406 may be made from, for example, steel, such as hardened tool steel or other wear-resistant alloys.

Compliant first rollers 404 may be located between neighboring cutter rollers 403. Compliant first rollers 404 may be mounted so as to rotate with cutter arbor 401 and cutter rollers 403. Compliant first rollers 404 may be of a larger diameter than cutter rollers 403. Compliant first rollers 404 may be mounted to, or concentric with, non-compliant ring 405. Non-compliant ring 405 may be used as a spacer to establish spacing between neighboring cutter rollers 403. Non-compliant ring 405 may also be used to tune the amount of radial compressive force required to displace a portion of the outer surface of compliant first roller with respect to the outer surface of cutter roller 403. Compliant first rollers 404 may be manufactured from an elastomer or other compliant material. Non-compliant rings 405 may be manufactured from a substantially non-compliant material, such as steel. Compliant first rollers 404 may be slipped onto non-compliant rings 405, or may be formed directly onto non-compliant rings 405.

Compliant second rollers 407 may be located between neighboring support rollers 406. Compliant second rollers 407 may be mounted so as to rotate with support arbor 402 and support rollers 406. Compliant second rollers 407 may be of a larger diameter than support rollers 406. Compliant second rollers 407 may be mounted to, or concentric with, non-compliant ring 408. Non-compliant ring 408 may be used as a spacer to establish spacing between neighboring support rollers 406. Non-compliant ring 408 may also be used to tune the amount of radial compressive force required to displace a portion of the outer surface of compliant second roller with respect to the outer surface of support roller 406. Compliant second rollers 407 may be manufactured from an elastomer or other compliant material. Non-compliant rings 408 may be manufactured from a substantially non-compliant material, such as steel. Compliant second rollers 407 may be slipped onto non-compliant rings 408, or may be formed directly onto non-compliant rings 408.

The various components described herein may be single components, or may be composed of a plurality of components. For example, compliant first rollers 404 may include an elastomeric outer ring encapsulating a steel hub. In another example, cutter rollers 403 may include a hardened steel outer race slipped over a less hard inner hub. It is to be understood that structures which provide the basic functionality of the structures described herein are contemplated as being within the scope of this disclosure as well.

The various rollers may be mounted to their respective arbors by any appropriate means, including but not limited to, bolting, friction mounting, etc. In certain implementations, the rollers may be connected to each other, e.g., by bolts.

Figure 4C:
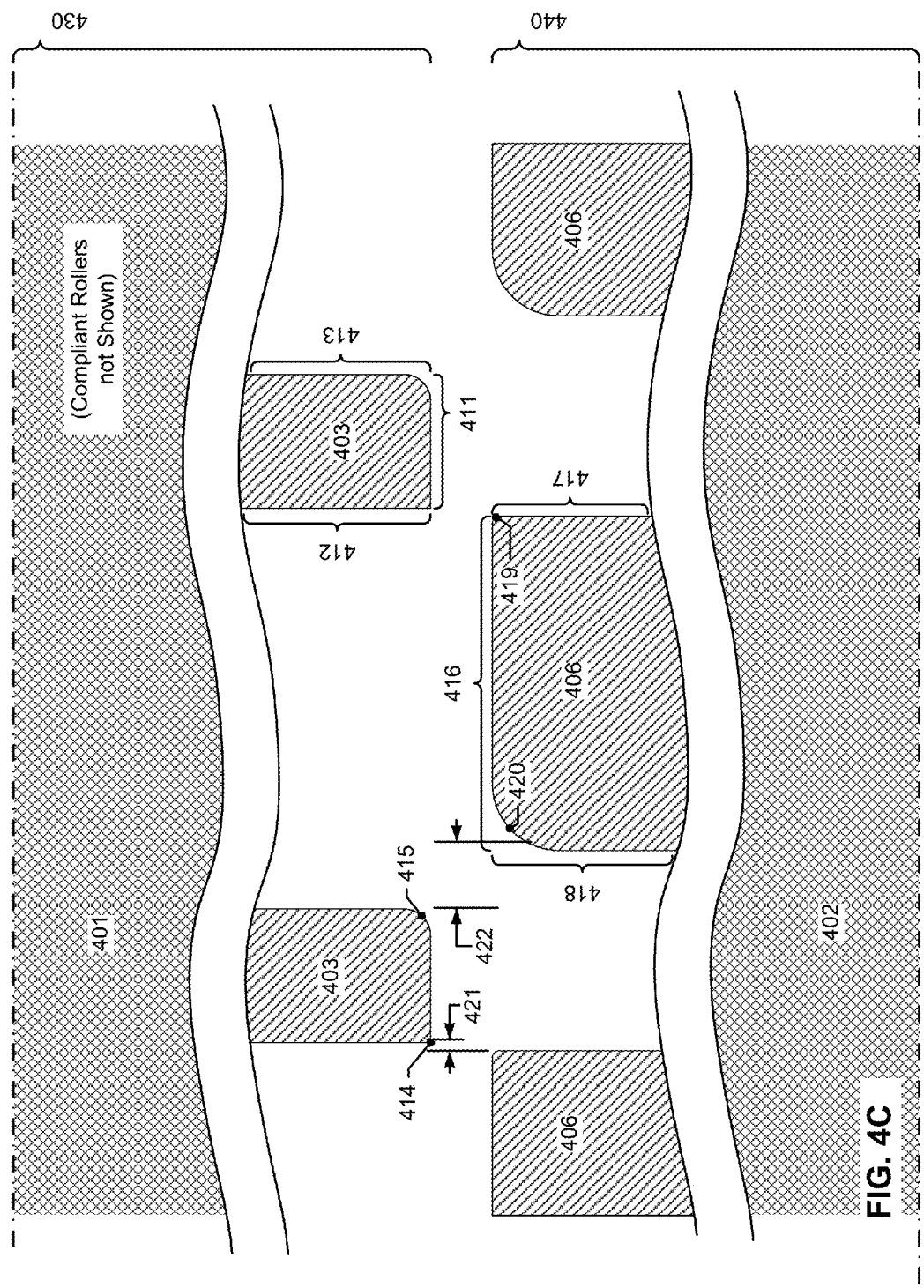
FIG. 4C depicts the view shown in FIG. 4B with some components omitted for clarity.

FIG. 4C shows the same view as depicted in FIG. 4B, but with compliant first rollers 404 and compliant second rollers 407 removed for the sake of clarity. Various features of cutter rollers 403 and support rollers 406 are depicted. While cutter arbor 401 and cutter rollers 403 are shown, portions of these components have been omitted to allow structures of interest to be shown with sufficient scale. Similar conventions have been adopted for support arbor 402 and support rollers 406.

Cutter rollers 403 may include cutter-web contact surface 411 which is configured to contact a PV stack web (not shown) which is fed between cutting cylinder 430 and support cylinder 440. Cutter rollers 403 may also include first side 412 and second side 413. Cutter rollers 403 may further include first edge 414 and second edge 415. First edge 414 is generally defined by the intersection of first side 412 and cutter-web contact surface 411. It is to be understood that first edge 414 and/or second edge 415 may be rounded edges, and that the actual intersection of first side 412 and cutter-web contact surface 411 may be replaced by the rounded edge.

Support rollers 406 may include support-web contact surface 416 which is configured to contact a PV stack web (not shown) which is fed between cutting cylinder 430 and support cylinder 440. Support rollers 406 may also include third side 417 and fourth side 418. Support rollers 406 may further include third edge 419 and fourth edge 420. Third edge 419 is generally defined by the intersection of third side 417 and support-web contact surface 416. It is to be understood that third edge 419 and/or fourth edge 420 may be rounded edges, and that the actual intersection of third side 417 and support-web contact surface 416 may be replaced by the rounded edge.

Cutter rollers 403 and support rollers 406 may be configured such that cutter rollers 403 and neighboring support rollers 406 are separate by first gap 421 and second gap 422. First gap 421 may be defined by the distance along rotational axes 409 or 410 between first side 412 of a cutter roller 403 and the closest third side 417 of a neighboring support roller 406. Second gap 422 may be defined by the distance along rotational axes 409 and 410 between second side 413 of a cutter roller 403 and the closest fourth side 418 of a neighboring support roller 406.

In some implementations, first gap 421 may be larger than or equal to approximately half of the thickness of the PV stack web that will be fed between cutting cylinder 430 and support cylinder 440. In some further implementations, first gap 421 may also be no larger than 3 times the thickness of the PV stack web that will be fed between cutting cylinder 430 and support cylinder 440. Second gap 422 may be substantially larger than first gap 421. For example, second gap 422 may be between 10 and 100 times larger than first gap 421.

First gap 421 may be selected in substantial part based on the degree to which cutter rollers 403 and support rollers 406 radially overlap, i.e., intermesh, during cutting operations, the thickness and material strength of the PV stack web, the thickness of the PV stack web, and the degree of angular displacement desired in the up-burrs and down-burrs of the PV cell strips which are produced from the PV stack web. In some implementations, there may not be any radial overlap, although the rollers may still be in very close proximity to each other.

Second gap 422 may be selected in substantial part based on the degree to which cutter rollers 403 and support rollers 406 radially overlap during cutting operations, the thickness and material strength of the PV stack web, the thickness of the PV stack web, and the amount of contact area required to grip the PV stack web between cutter-web contact surfaces 411 and opposing compliant second rollers (not shown in FIG. 4C) and between support-web contact surfaces 416 and opposing compliant first rollers (also not shown in FIG. 4C) without significant slippage while the PV stack web is fed between cutter cylinder 430 and support cylinder 440. Second gap 422, as well as any relief provided by any rounding of second edges 415 and fourth edges 420, must also be sufficient large enough to allow the PV stack web to be deflected, without fracture or substantial plastic deformation, by at least the thickness of the PV stack web plus the amount of radial overlap between cutter rollers 403 and support rollers 406.

As noted above, some, one, or all of first edges 414, second edges 415, third edges 419, and fourth edges 420 may be rounded edges. In some implementations, first edge 414 may be a substantially sharp edge with no engineered rounding. It is to be understood that some rounding may be introduced which is not intended to be present, for example, over time, a sharp edge may be rounded by wear and tear from repeated cutting operations. It is to be further understood that, as used herein, "rounded" or "radiused" parts refer to parts with engineered rounds or radii. In some implementations, third edge 419 may, if first edge 414 has a rounded edge, have a greater round radius than first edge 414. In some implementations, second edge 415 and fourth edge 420 may have greater round radii than either first edge 414 or third edge 419, which may assist in preventing fracture or substantial plastic deformation.

Figure 4D:
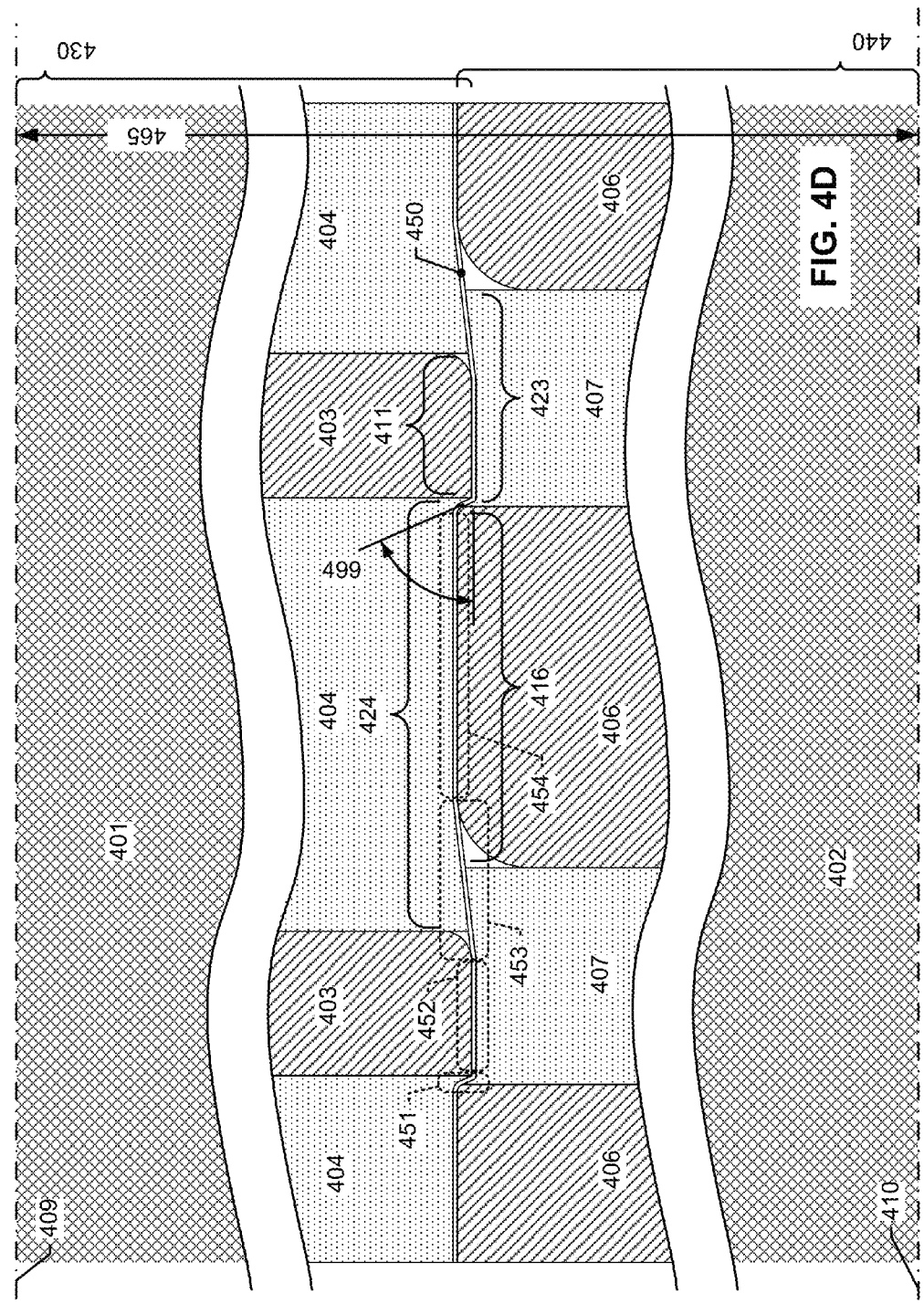
FIG. 4D depicts the components shown in FIG. 4B configured for cutting a PV web.

FIG. 4D depicts the implementation shown in FIG. 4C, although with compliant first rollers 404, compliant second rollers 407, and PV stack web 450 added. The offset 465 between rotational axes 409 and 410 has also been reduced such that cutter rollers 403 and support rollers 406 radially overlap. This results in localized compression of compliant first rollers 404 and compliant second rollers 407.

As can be seen in FIG. 4D, the radial overlap of substantially non-compliant cutter rollers 403 and substantially non-compliant support rollers 406 deforms PV stack web 450 in zones 451 and 453. Simultaneously with this deformation, PV stack web 450 is substantially prevented from significant overall displacement across the length of cutter cylinder 430 and support cylinder 440 in a direction parallel to rotational axes 409 and 410 by clamping forces provided by the gripping of PV stack web 450 in zones 452 between cutter-web contact surfaces 411 and second roller-web contact surfaces 423 of opposing compliant second rollers 407 and in zones 454 between support-web contact surfaces 416 and first roller-web contact surfaces 424 of opposing compliant first rollers 404. As a result, PV stack web 450 may experience localized strain in zone 451 which plastically deforms PV web stack 450 to form a geometry which will form an up-burr and a down-burr after processing is complete. As PV stack web 450 is plastically deformed in zones 451, PV stack web 450 is elastically deformed in zones 453.

As sufficient localized strain is induced in zones 451, the yield strength of PV stack web 450 may be exceeded, causing localized in-plane fracture of PV stack web 450. It should be understood that the fracture is in-plane in the deformed region of zone 451 rather than in the general plane of PV stack web 450, and that the local orientation of the deformed region of zone 451 may be at a substantial angle 499 to the general plane of PV stack web 450. The in-plane fracture may cause PV stack web 450 to separate into parallel strips, each strip bounded by a torn edge produced in zone 451. Due to the plastic deformation of PV stack web 450 in region 451, the in-plane fracture of PV stack web 450 results in the simultaneous formation of an up-burr on one fractured edge and a down-burr on the other fractured edge. In this manner, each strip may be bounded by an up-burr along one edge, and a down-burr on the opposing parallel edge. The strips formed at either end of PV stack web 50 may feature only one edge with an up-burr or a down-burr, as the remaining edge may be formed by an existing edge of PV stack web 450. In some implementations, the existing edges of PV stack web 450 are removed as well, and each strip includes an up-burr edge and a parallel and opposing down-burr edge. The portions of PV stack web 450 in zones 453 may be elastically deformed during the cutting process, but may return to their pre-deformation condition after PV stack web 450 is unclamped from between substantially non-compliant cutter rollers 403 and substantially non-compliant support rollers 406.

Figure 5A:
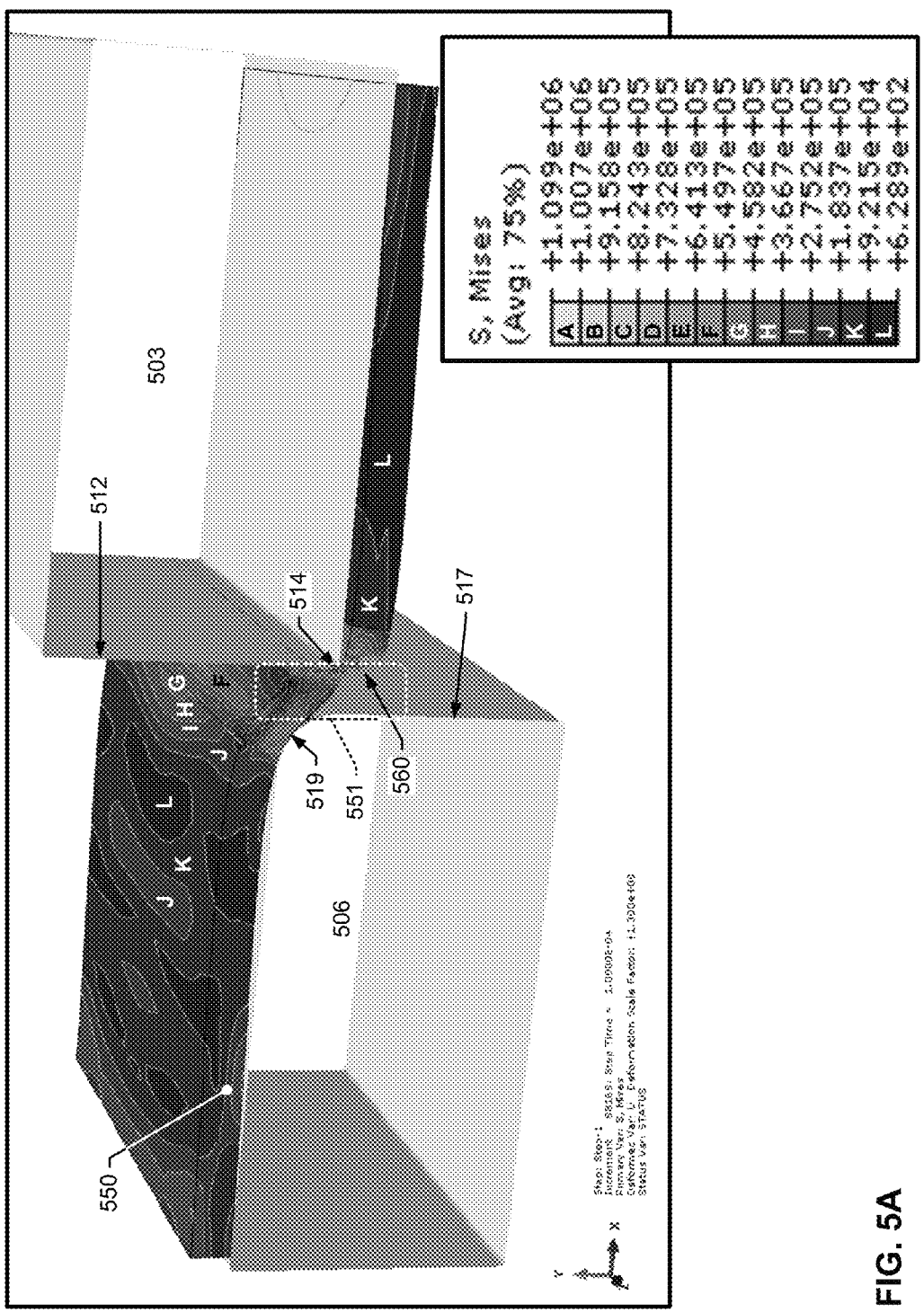
FIG. 5A depicts an analysis of a cutting operation as described herein.
Figure 5B:
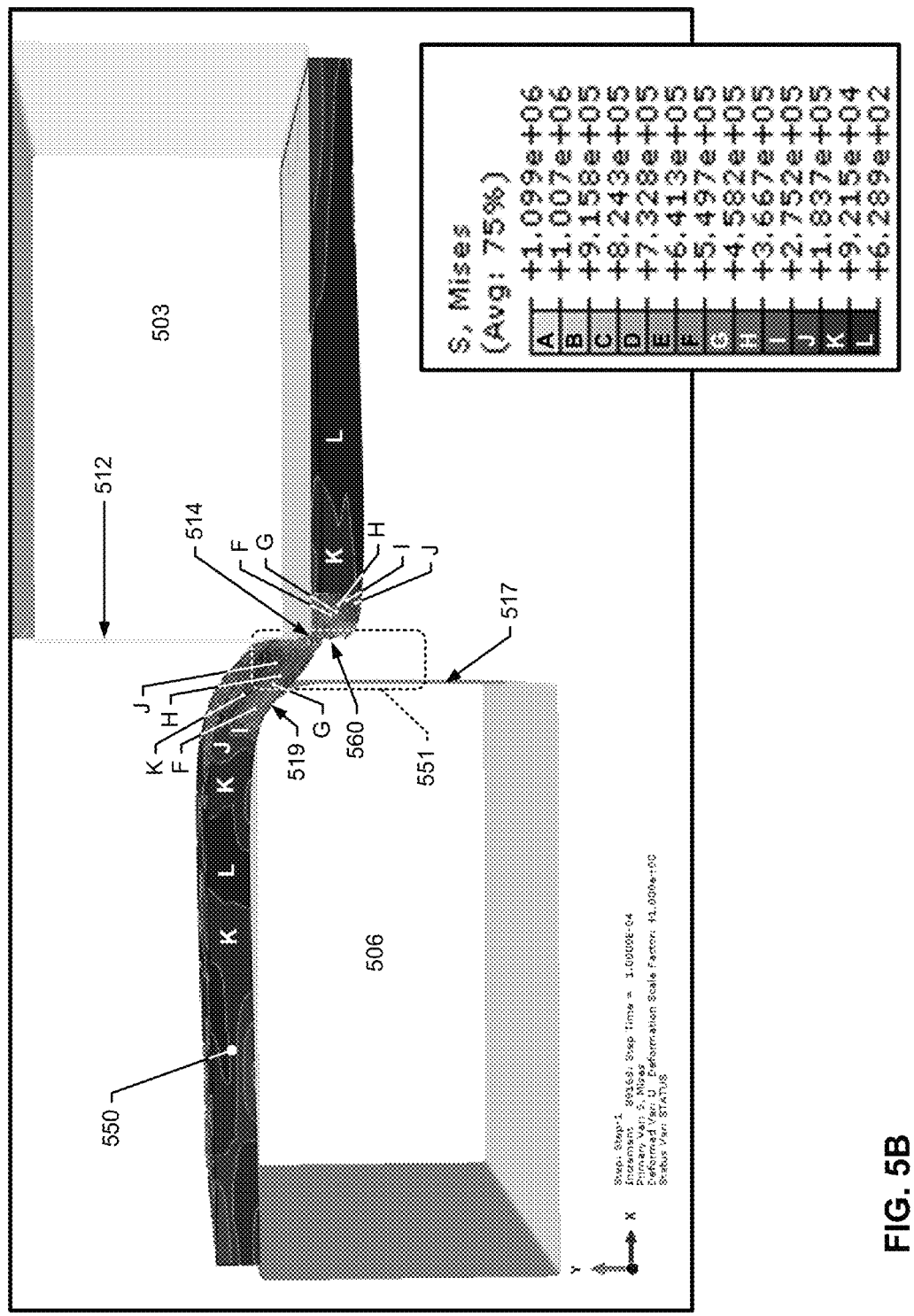
FIG. 5B depicts the analysis of FIG. 5A from a different perspective.

FIGS. 5A and 5B show a simulation of the deformation and fracturing in the plastic deformation zone of a PV stack web from two different viewpoints. Certain components, such as the arbors and compliant rollers, have been omitted for simplicity. Other components, such as support roller 506 and cutter roller 503, have been modeled only in part. PV stack web 550 is in contact with support roller 506 on one face and in contact with cutter roller 503 with the opposing face. Support roller 506 and cutter roller 503 radially overlap each other and are axially separated by first gap 521 between first side 512 and third side 517. Due to the radial overlap and first gap, PV stack web 550 may roll over first edge 514 and third edge 519 and, in doing so, deform plastically in zone 551. In the analysis shown in FIG. 5, a fracture develops at 560, causing PV stack web 550 to separate into two portions. Letter callouts have been used in some locations to assist in determining which color bands correlate to the indicated stress levels shown in the legends.

The above description of a cutting apparatus provides a framework for describing methods of cutting that may be employed with the present invention. The methods of cutting described further below are not, however, limited to the specific apparatuses described above.

Figure 6:
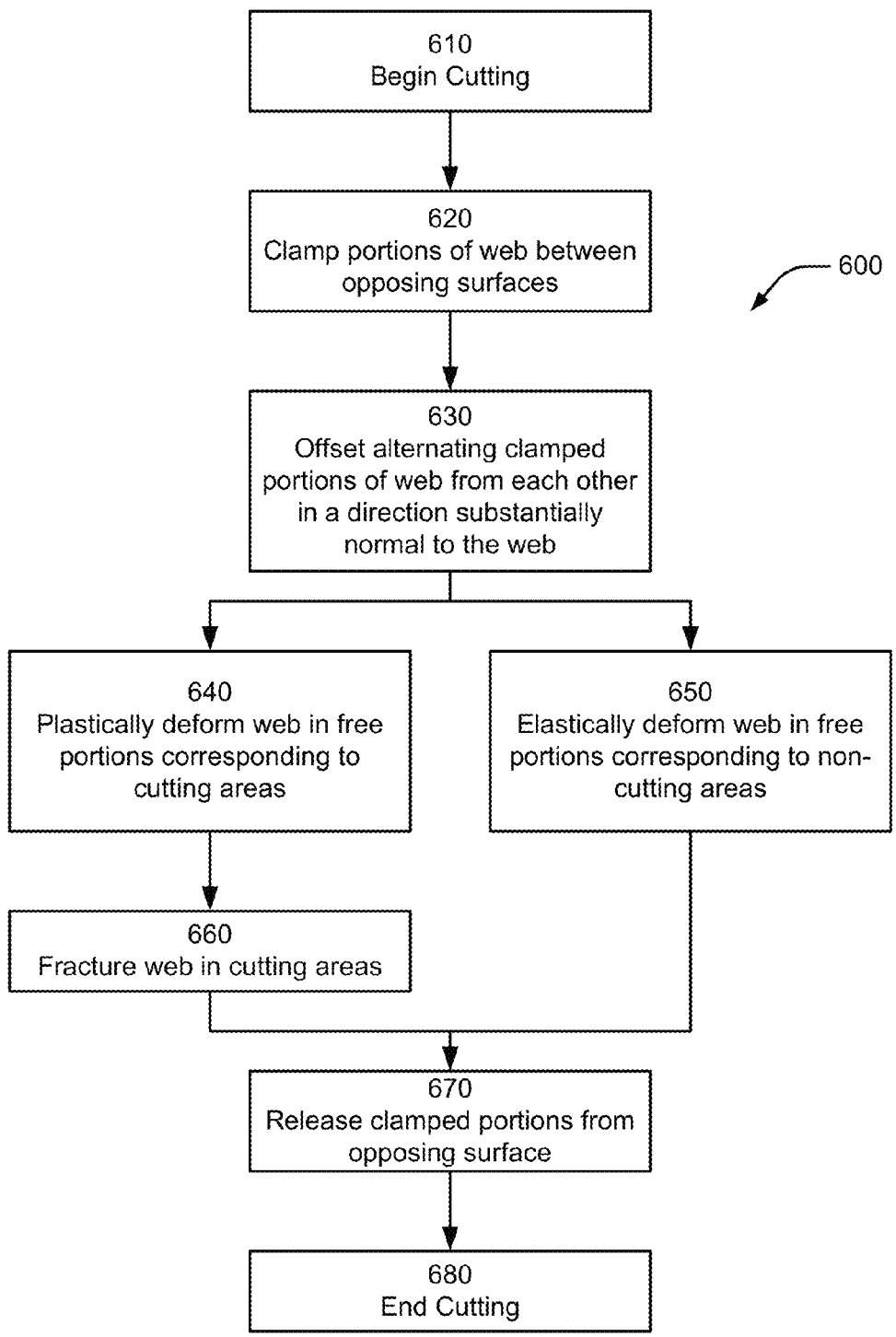
FIG. 6 is a flow diagram of a cutting technique described herein.

FIG. 6 depicts one technique for cutting a PV stack web (600). According to various implementations, the cutting process begins (610) when portions of a PV stack web of thickness t are clamped in place between two opposing surfaces such that the clamped portions are substantially immobilized with respect to motion relative to each other in the plane of the PV stack web (620). Each clamped portion is also constrained to be substantially immobilized with respect to motion in a direction substantially normal to the PV stack web relative to the surfaces clamping it. Portions of the PV stack web between each pair of clamped portions, referred to herein as "free portions," are subject to little or no clamping, and the PV stack web may flex, stretch, or move in these free portions. There is generally one free portion in each region of the PV stack web which will be cut, and a second free portion in between each of the regions of the PV stack web which will be cut.

To cut the PV stack web, alternating clamped portions of the PV stack web may be moved in opposite directions in a direction substantially normal to the PV stack web. In this manner, alternating clamped portions of the PV stack web may be offset from each other (630). To accommodate such an offset, the free portions of the PV stack web are forced to stretch, inducing strain, in order for the clamped portions to transition to the free portions.

The free portions corresponding to the cutting regions may be much smaller in width than the intervening free portions, causing the PV stack web to strain to a greater amount in the free portions corresponding to the cutting regions than in the intervening free portions. With a sufficiently large enough offset, sufficient plastic strain may be induced in the free portions corresponding to the cutting regions that fracture and/or tearing results in these free portions (640, 660). At the same time, the intervening free portions may be strained to a much lower degree such that little or no plastic strain occurs, i.e., the intervening free portions may undergo elastic strain (650). After the web has been cut, the clamped portions may be released (670) and the cutting may end (680). The above operations may be performed in a relatively continuous manner, such as through a roller system as outlined below.

Figure 7:
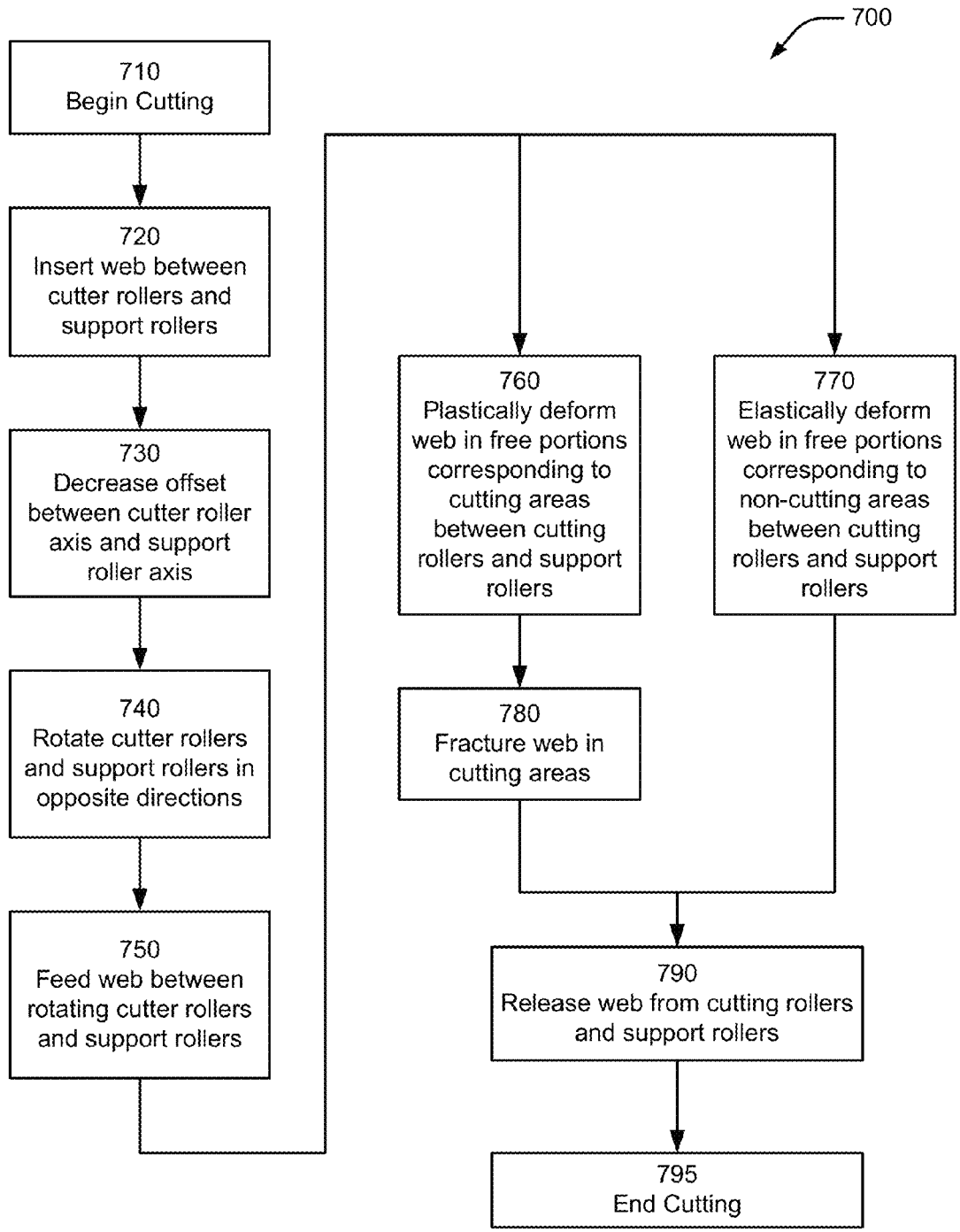
FIG. 7 is another flow diagram of a cutting technique described herein.

While the above paragraphs describe a general method for cutting a PV stack web, the following paragraphs and FIG. 7 describe a technique for cutting a PV stack web using equipment similar to that discussed earlier (700).

A PV stack web with a first face, a second face opposite the first face, and a thickness t may be fed between a plurality of coaxially-mounted cutter rollers and a plurality of coaxially-mounted support rollers and cut into strips. The axes of the rollers may be set to be parallel to, and offset from, each other by a distance sufficient allow the cutter rollers to contact the first face and the support rollers to contact the second face. The cutter rollers and the support rollers may be positioned such that they interleave in a non-interfering manner when the offset is decreased such that the cutter rollers and the support rollers radially overlap.

Each cutter roller may include a first edge and a second edge. Each support roller may have a third edge and a fourth edge. The first, second, third, and fourth edges may be circumferential edges of their respective rollers. Each third edge may be offset from the closest first edge along the support roller axis by a substantially smaller amount than the corresponding fourth edge is offset from the closest second edge.

To begin (710), the PV stack web may be inserted (720) between the cutter rollers and the support rollers. The offset between the cutter roller rotational axis and the support roller rotational axis may then be decreased (730) until the cutter rollers contact the first face and the support rollers contact the second face. The offset may then be further decreased to deform the PV stack web in each area between a first edge and the closest third edge, and in each area between a second edge and the closest fourth edge. In some implementations, the offset may be decreased prior to inserting the PV stack web between the cutter rollers and the support rollers.

After insertion of the PV stack web between the cutter rollers and the support rollers, the cutter rollers may be rotated in a first direction, and the support rollers rotated in an opposite, second direction (740). In this manner, the PV stack web is fed between the cutter rollers and the support rollers (750). In some implementations, rotation of the cutter rollers and support rollers may be initiated prior to insertion of the PV stack web between the cutter rollers and the support rollers.

Decreasing the offset may occur either before the PV stack web is fed through the cutter rollers and support rollers, or while the PV stack web is fed through the cutter rollers. The offset may be decreased to cause deformation of the PV stack web between the cutter rollers and the support rollers. The deformation occurs because the offset between the cutter rollers and the support rollers is sufficiently small that any gap between the two sets of rollers when viewed along the rotational axes is less than thickness t.

In addition to the cutter rollers, the apparatus may include substantially compliant first rollers between, and coaxial with, the cutter rollers and substantially compliant second rollers between, and coaxial with, the support rollers. The compliant first rollers may be rotated with the cutter rollers, and the compliant second rollers may be rotated with the support rollers.

Tension and plastic strain may be induced in portions of the PV stack web which are between a first edge and the closest third edge, i.e., in the region to be cut (760). These portions may be strained so as to have a local orientation which is at an angle with respect to the general plane of the PV stack web (see 499 of FIG. 4D). Such portions may be strained sufficiently to initiate fracturing of the PV stack web in the strained area (780). Fracturing may be induced, if needed, by decreasing the offset even further. The deformation of the PV stack web may include roll-forming the first face of the PV stack web over the first edge and roll-forming the second face of the PV stack web over the third edge.

Tension and elastic strain may be induced in portions of the PV stack web which are between a second edge and the closest fourth edge, i.e., free portions corresponding to non-cutting areas between the cutting rollers and the support rollers (770). These portions may be strained so as to have a local orientation which is also at an angle with respect to the general plane of the PV stack web, but to a much lesser degree than the portions in the regions to be cut. As the PV stack web is fed through the cutter rollers and support rollers, the cut portion of the PV stack web is released from the cutter roller/support roller assembly (790). In 795, cutting stops, although the process may proceed in more or less a continuous manner as the PV stack web is fed through the cutting device.

Although the description refers chiefly to cutting a substrate into cell-width sized strips, the cutting methods and apparatuses described herein may be used for other thin film or PV cell cutting applications requiring reduced or no edge shunting and engineered edge burrs. For example, the number or arrangement of blades may be modified to cut modules, perform transverse cuts, etc. The methods and apparatuses described above may also be used for any PV cell or other thin film application, e.g., involving cutting a conductive thin film on a conductive substrate in which shunting between the two is undesired or wherein up-cuts are undesired.

While the figures described herein have depicted a cutter cylinder which is located above the support cylinder, a reverse configuration is also with the scope of this disclosure. In other implementations, a vertically-oriented cutting apparatus having vertically oriented cylinders may be provided, e.g., to cut a substrate oriented perpendicular to the ground.

High throughput methods of producing thin film PV strips are provided. These methods include cutting a substrate as described above, with a substrate/thin film stack on a roll or as discrete sheets being fed through a cutting apparatus at rates of 30 ft/min or higher. In certain implementations, multiple strips are cut from the substrate, e.g., over ten or over twenty strips. These strips may then be further cut to define multiple cells.

Although the foregoing invention has been described in some detail for purposes of clarity of understanding, it will be apparent that certain changes and modifications may be practiced within the scope of the invention. It should be noted that there are many alternative ways of implementing both the processes and apparatuses of the present invention. Accordingly, the present implementations are to be considered as illustrative and not restrictive, and the invention is not to be limited to the details given herein.

What is claimed is:

1. An apparatus for cutting a web with a first face, a second face opposite the first face and offset from the first face by a nominal thickness t, the apparatus comprising:
    a plurality of cutter rollers, each cutter roller including a substantially cylindrical cutter-web contact surface, a first side, and a second side, wherein the cutter-web contact surface intersects the first side to form a first edge;
    a cutter arbor, wherein each cutter roller is coupled with the cutter arbor such that the cutter-web contact surfaces are coaxial with each other;
    a plurality of support rollers, each support roller including a substantially cylindrical support-web contact surface, a third side, and a fourth side, wherein the support-web contact surface intersects the third side to form a third edge, wherein the third edge is rounded with a third radius;
    a support arbor, wherein each support roller is coupled with the support arbor such that the support-web contact surfaces are coaxial with each other, wherein center axes of the cutter-web contact surfaces and the support-web contact surfaces are parallel and offset such that the web may be fed between the cutter arbor and the support arbor with the first face contacting the cutter-web contact surfaces and the second face of the web contacting the support-web contact surfaces, and wherein the support rollers and the cutter rollers are axially spaced such that the support rollers and the cutter rollers interleave in a non-interfering manner when the support arbor and the cutter arbor are configured such that the offset is less than half the sum of the largest diameter of the support rollers and the largest diameter of the cutter rollers, wherein:
        the first sides are offset from the third sides by first gaps,
        the minimum separation between the first edge and the third edge associated with each first gap is greater than t,
        the cutter-web contact surface intersects the second side to form a second edge,
        the support-web contact surface intersects the fourth side to form a fourth edge,
        the second edge is rounded with a second radius,
        the fourth edge is rounded with a fourth radius,
        the first edge is rounded with a first radius substantially smaller than the third radius, and
        the second radius and the fourth radius are larger than the third radius.

2. The apparatus of claim 1, wherein the apparatus is configured to allow the offset to be varied.

3. The apparatus of claim 1, further comprising:
    a plurality of compliant first rollers, each compliant first roller including a substantially cylindrical first-roller-web contact surface, wherein each compliant first roller is coupled with the cutter arbor such that the first-roller-web contact surface is coaxial with the cutter-web contact surfaces and located between neighboring cutter rollers; and
    a plurality of compliant second rollers, each compliant second roller including a substantially cylindrical second-roller-web contact surface, wherein each compliant second roller is coupled with the support arbor such that the second-roller-web contact surface is coaxial with the support-web contact surfaces and located between neighboring support rollers.

4. The apparatus of claim 1, wherein the first edge is not rounded.

5. The apparatus of claim 3, wherein the first-roller-web contact surface includes a relief area of a smaller diameter than the largest diameter of the first-roller-web contact surface.

6. The apparatus of claim 3, wherein the second-roller-web contact surface includes a relief area of a smaller diameter than the largest diameter of the second-roller-web contact surface.

7. The apparatus of claim 1, wherein the second side and the fourth side of each of the cutter rollers and neighboring support rollers, respectively, are offset by a second gap, wherein the second gaps are larger than the first gaps.

8. The apparatus of claim 1, wherein the apparatus is configured to tear the web in regions of the web which are bracketed between the first edge and the third edge of neighboring cutter and support rollers when the web is fed through the apparatus.

9. The apparatus of claim 1, wherein the apparatus is configured to maximize in-plane loading on the web in regions of the web which are bracketed between the first edge and the third edge of neighboring cutter and support rollers when the web is fed through the apparatus.

10. The apparatus of claim 9, wherein the apparatus is configured to minimize shear loading through the thickness of the web in regions of the web which are bracketed between the first edge and the third edge of neighboring cutter and support rollers when the web is fed through the apparatus.

11. The apparatus of claim 8, wherein the tear is formed closer to the first edge than the third edge.

12. The apparatus of claim 3, wherein the apparatus is configured to form a first clamping region between each cutter-web contact surface and the corresponding secondroller-web contact surface and form a second clamping region between each support-web contact surface and the corresponding first-roller-web contact surface, such that portions of the web clamped in the first clamping region and the second clamping region are held substantially parallel by the cutter-web contact surfaces, the support-web contact surfaces, the first-roller-web contact surfaces, and the second-roller-web-contact surfaces when the web is fed through the apparatus.

13. The apparatus of claim 12, wherein the apparatus is configured such that the first regions are offset from the second regions, the portions of the web which are not in the first region or the second region but are between the second edges and the fourth edges are flexed through a first acute angle, and the portions of the web which are not in the first region or the second region but are between the first edges of the cutter rollers and the third edges of the support rollers are flexed through a second acute angle substantially larger than the first acute angle.

14. The apparatus of claim 13, wherein the distance between each first edge is approximately 35 mm.

* * * * *